Dec. 22, 1959  J. T. CORNILLAUD  2,918,146
BRAKE ADJUSTING DEVICE
Filed Sept. 21, 1956

INVENTOR.
JACK T. CORNILLAUD
BY
ATTORNEY

United States Patent Office 2,918,146
Patented Dec. 22, 1959

2,918,146

BRAKE ADJUSTING DEVICE

Jack T. Cornillaud, Dearborn, Mich., assignor to General Motors Corporation, Detroit, Mich., a corporation of Delaware Application September 21, 1956, Serial No. 611,246

3 Claims. (Cl. 188—78)

This invention relates to an adjusting device for the shoes of a brake for a motor vehicle.

Brakes of the drum type that have internally expanding shoes wherein the shoes are anchored at one end with an applying device disposed between the shoes at the anchor end with an adjusting device located between the opposite adjacent ends of the shoes to effect adjustment of the shoes relative to the brake drum have a peculiarity of vibration that creates a squeak or squawk. Since brakes of this character have a continuous metallic contact from one end of the shoe through the adjusting device into the opposite shoe, it is believed the vibrations in the shoes caused during a braking operation are transmitted to the drum because of the metallic contact with the anchor to make the vibration audible exteriorly of the brake.

It is therefore an object of this invention to break the metallic contact between adjacent ends of a pair of cooperating brake shoes to damp the vibrations and prevent their transmission to the brake drum to such an extent that the vibrations effect an audible sound exterior of the brake.

Further objects and advantages of the present invention will be apparent from the following description, reference being had to the accompanying drawings wherein a preferred form of the invention is clearly shown.

Figure 1:
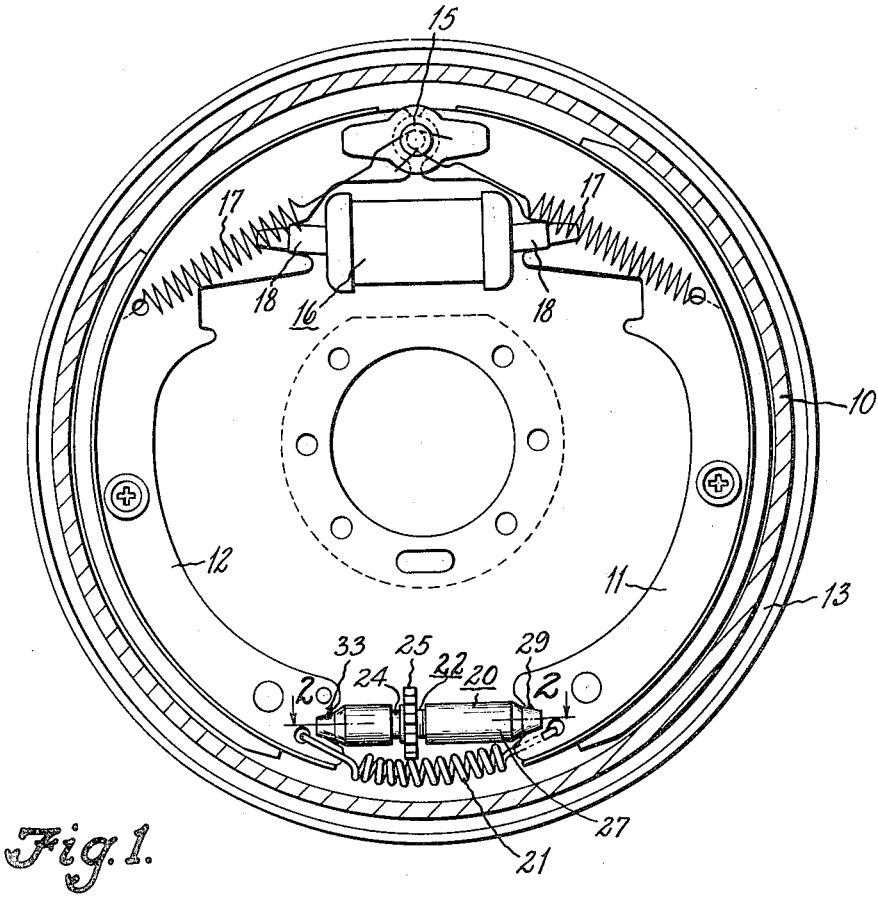
Figure 1 is a cross sectional view of a brake illustrating the brake actuating mechanism in elevation, the adjusting device of the brake incorporating features of this invention.

In this invention the brake consists of a brake drum 10 that is carried on the wheel of a vehicle in conventional manner. A pair of brake shoes 11 and 12 are located within the drum 10 and are stationarily supported on the backing plate 13 which in turn is carried on the axle housing of the vehicle in conventional manner.

The brake shoes 11 and 12 engage an anchor pin at one end of the shoes, an applying device 16 also being provided between the brake shoes at the anchor end of the shoes. The applying device may be a conventional fluid motor, commonly known as a wheel cylinder, of a hydraulic brake actuating system. Retraction springs 17 retain the brake shoes 11 and 12 in engagement with the anchor 15 of the operating plungers 18 of the wheel cylinder or actuating device 16. The opposite ends of the brake shoes 11 and 12 engage opposite ends of an adjusting device 20, a spring 21 retaining the ends of the brake shoes in engagement with the adjusting device.

Figure 2:
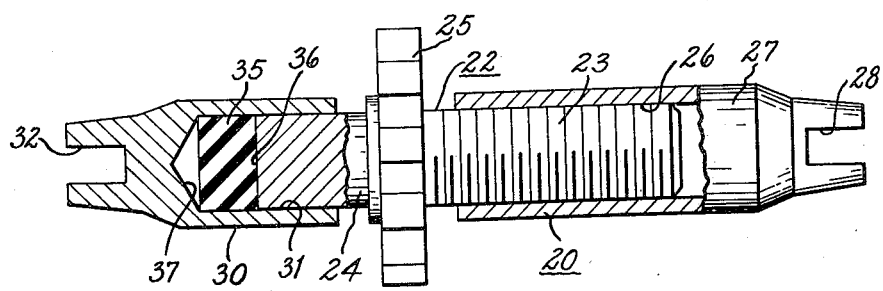
Figure 2 is a cross sectional view of the brake adjusting device taken along line 2—2 of Figure 1.

The adjusting device is more particularly illustrated in Fig. 2 and consists of an adjusting screw 22 that has a threaded portion 23 at one end and a smooth shank portion 24 at the opposite end, the shank portion 24 being preferably in the form of a cylinder. An adjusting wheel 25 is disposed between the ends of the adjusting screw and is engaged by the spring 21 to lock the wheel 25 in an adjusted position, the edge periphery of the wheel 25 having serrations that engage the spring to lock the wheel against rotation unless forceably rotated during an adjustment of the brake.

The threaded portion 23 of the screw 22 is received in the internal threaded bore 26 of the sleeve 27. The sleeve 27 has a slot 28 that engages the web 29 of the brake shoe 11 and prevents rotation of the sleeve relative to the brake shoe.

The smooth shank portion 24 of the adjusting screw 22 is slidably received in the smooth bore 31 of the sleeve 30. The sleeve 30 has a slot 32 that engages the web 33 of the brake shoe 12 and thereby prevents rotation of the sleeve 30 relative to the brake shoe.

The body of non-metallic material 35 is placed within the bore 31 of the sleeve 30 between the end 36 of the shank portion 24 and the end 37 of the bore 31. Preferably this non-metallic material is of a rubber-like substance or it can be of a rubber and fabric ply construction.

In the conventional adjusting device, the shank 24 of the adjusting screw is threadedly received in a threaded bore of the sleeve 30, the screw thread being the reverse of that of the threaded end 23. Thus rotation of the adjusting wheel 25 will effect extension or contraction of the adjusting device for movement of the brake shoes relative to the brake drum. However, in this conventional construction there is a continuity of metal contact from one brake shoe to the other that permits vibrations of the shoes to be transferred between the shoes and ultimately through the anchor pin to the backing plate of the brake so that the vibrations effect an audible sound exterior of the brake.

The body of non-metallic material 35 breaks the metallic contact between the brake shoes 11 and 12 and also damps the vibrations of the shoes so that the vibrations of either of the shoes is effectively stopped at the resilient body 35 without transfer of the vibrations to the anchor pin or other parts of the backing plate engaged by the brake shoes on which they are supported. The body of resilient-like material 35 therefore effectively silences the squeak or squawk created in a brake resulting from a brake operation.

While the form of embodiment of the invention as herein disclosed constitutes a preferred form, it is to be understood that other forms might be adopted as may come within the scope of the claims which follow.

What is claimed is as follows:

1. A brake comprising a drum and shoes engageable therewith and having applying means at one end of the shoes and adjustable connecting means between the opposite ends of the shoes, said connecting means comprising, a rotatable screw member having a threaded portion at one end and a smooth shank portion at the opposite end, a first sleeve threadedly receiving said screw portion and engaging one of the shoes, a second sleeve slidably receiving said smooth shank portion and engaging the opposite shoe, and a non-metallic body in said second sleeve between the sleeve and the said shank portion, said second sleeve and said shank portion forming a chamber of larger volume than said non-metallic body to permit deformation of said body, and a resilient connection between the shoes.

2. A hydraulic brake comprising a drum and shoes engageable therewith and having hydraulic applying means at one end of the shoes and adjustable connecting means between the opposite ends of the shoes, said adjustable means comprising a sleeve connected to one of said shoes, a threaded internal portion of said sleeve for receiving a screw member, the opposite end of said screw member having a smooth shank portion, a second sleeve connected to the other shoe for receiving the shank portion of said screw member, a body of resilient non-metallic material retained within a chamber formed by said second sleeve and abutting said shank portion of said screw member, said chamber in said second sleeve having a cone-shaped portion containing air adjacent to said non-metallic material to permit deformation of said non-metallic material and provide a resilient connection between said brake shoes.

3. A brake comprising a drum and shoes engageable therewith and having applying means at one end of the shoes and adjustable connecting means between the opposite ends of the shoes having a rotatable screw member engaging an internally-threaded sleeve, said sleeve connected to one of the shoes, a second sleeve engaging the opposite shoe with a body of nonmetallic material in a chamber formed in said second sleeve and the end of the smooth cylindrical portion on said screw member received within said second sleeve and engaging said body of non-metallic material, said chamber in said second sleeve being of a larger volume than said body of said non-metallic material to permit deformation of said body and provide a resilient connection for damping vibrations of said shoes.

References Cited in the file of this patent

UNITED STATES PATENTS

| | | |
|---|---|---|
| 2,139,083 | Kuiper | Dec. 6, 1938 |
| 2,157,994 | Baisch | May 9, 1939 |
| 2,215,747 | White et al. | Sept. 24, 1940 |
| 2,287,238 | Goepfrich | June 23, 1942 |
| 2,355,425 | Daniels | Aug. 8, 1944 |